April 13, 1943.                L. K. HEDDING                2,316,331
                        VOLTAGE REGULATING APPARATUS
                        Filed June 7, 1941          2 Sheets-Sheet 1

INVENTOR
Linnie K. Hedding
BY
HIS ATTORNEY

Patented Apr. 13, 1943

2,316,331

UNITED STATES PATENT OFFICE 2,316,331

VOLTAGE REGULATING APPARATUS

Linnie K. Hedding, Wilkinsburg, Pa., assignor to The Union Switch & Signal Company, Swissvale, Pa., a corporation of Pennsylvania Application June 7, 1941, Serial No. 397,067

8 Claims. (Cl. 175—363)

My invention relates to voltage regulating apparatus and particularly to apparatus for regulating the output voltage of a rectifier which is supplied with current through a transformer or reactor and which employs a stand-by battery for taking over the load upon failure of the alternating current or when the load becomes excessive. My apparatus is well suited for use in applications where the current demanded by the load is normally not very high but becomes high for short intervals, on occasion.

One object of my invention is to provide a voltage regulating automatic rectifier of the above type which has a current capacity substantially lower than usually required, the current capacity being determined in my apparatus by the normal load current output rather than by the maximum current load to which the apparatus may, at times, be subjected. Another object of my invention is to improve the load voltage regulation and to provide compensation for temperature changes.

I accomplish the foregoing objects by employing means cooperating with the control winding of the rectifier transformer or reactor and designed to limit the flow of load current through this winding, thus preventing the rectifier from taking on more than a predetermined load and causing the excess load to be assumed by the stand-by battery. More specifically, I accomplish these objects by employing a shunt having a negative resistance-voltage characteristic connected around the control winding so as to by-pass an increasingly greater proportion of the load current as the load increases. I accomplish improved voltage regulation by designing the shunt in such a manner that its resistance at high current values is low as compared with that of the control winding, whereby the total voltage drop in the combined regulating element, and the variation in this voltage drop with load, are decreased. I accomplish temperature compensation by designing the shunt to have a suitable negative resistance-temperature characteristic whereby at high ambient temperatures the shunt will be more effective in by-passing current from the control winding, thus relieving the rectifier of a greater proportion of the load during hot weather, when such action is more necessary.

I shall describe two forms of apparatus embodying my invention, and shall then point out the novel features thereof in claims.

Figure 1:
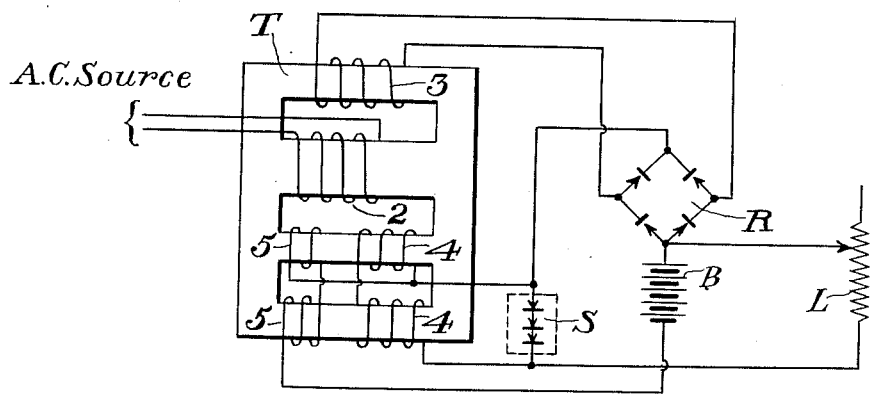
Figure 2:
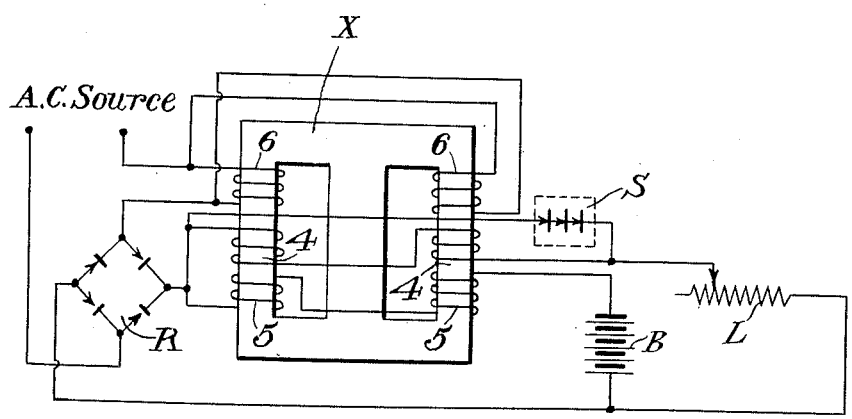
Figure 3:
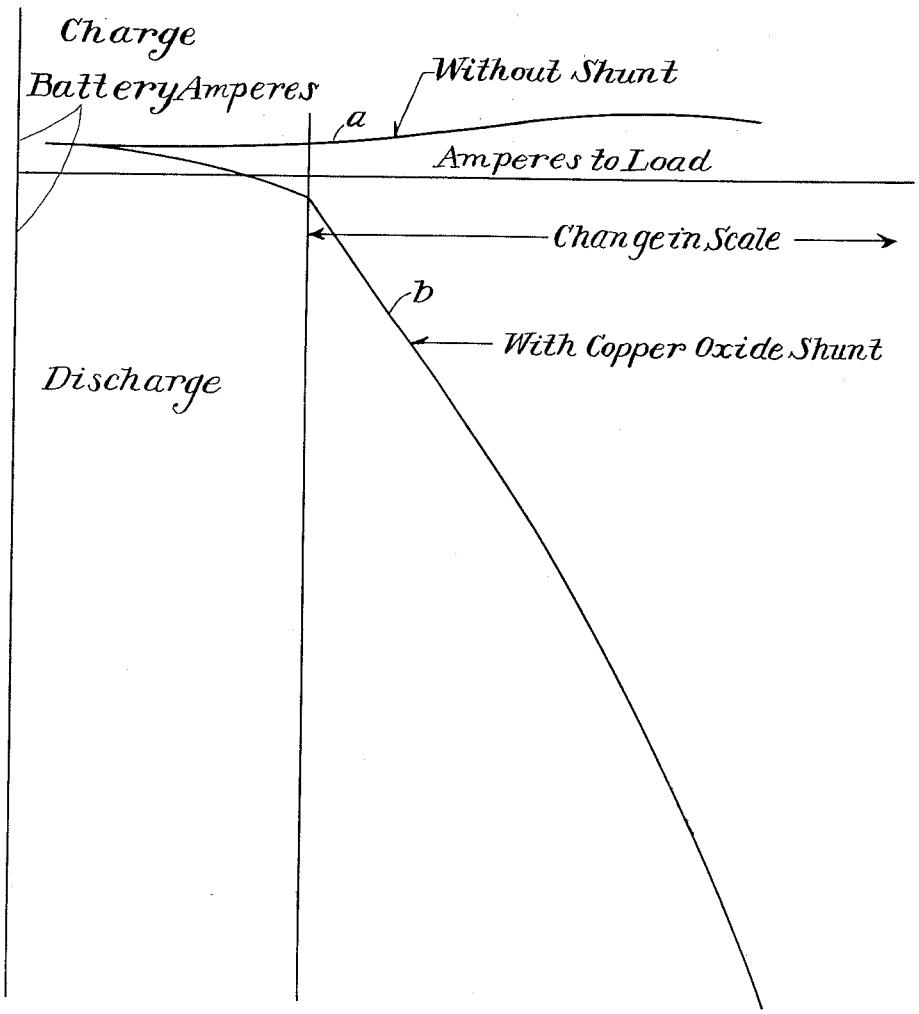

In the accompanying drawings, Fig. 1 is a diagrammatic view showing one form of apparatus embodying my invention, as applied to a rectifier supplied with current through a regulating transformer. Fig. 2 is a diagrammatic view showing another form of apparatus embodying my invention, as applied to a rectifier supplied with current through a regulating reactor. Fig. 3 is a curve diagram showing the manner in which the battery shares an increasing portion of the load, at high loads, with the apparatus embodying my invention.

Similar reference characters refer to similar parts in each of the two figures.

My invention is an improvement on the apparatus shown in the United States Patent No. 2,028,541, granted to Robert M. Gilson on January 21, 1936, for Apparatus for automatic regulation of rectifiers, and also on the apparatus shown in my copending United States application Serial No. 298,299, filed on October 6, 1939, for Electrical regulating apparatus.

Referring to Fig. 1 of the drawings, the reactive transformer T has an input winding 2 on one leg of the four-legged core and an output winding 3 on another leg of this core. The remaining two legs provide a shunt path for the transformer flux, in well-known manner, and these carry the load current or saturation windings 4—4 and battery current windings 5—5 which are divided into two equal portions and are wound in opposite directions on the individual legs of the magnetic shunt path to suppress the ripple effect due to the alternating flux. Windings 5—5 are wound in opposition to windings 4—4, whereby changes in the voltage of the alternating current supply will not cause excessive changes in the battery current, especially if the source B is a primary battery. The input winding 2 is energized from a suitable source of alternating current (not shown) and the voltage induced in the output winding 3 is impressed across the input terminals of a full-wave rectifier R which may be of any suitable type but is preferably a copper-oxide rectifier. One output terminal of the rectifier is connected to each of the windings 4, 5 in parallel, and the output current will take two paths, one of which may be traced through the load current windings 4—4, a suitable load L, to the other rectifier terminal, whereas the other path may be traced through the battery windings 5—5, through the battery B, to the rectifier terminal. Windings 5—5 are advantageous but are not essential to the operation of the apparatus embodying my invention, particularly if the voltage of the alternating current source remains substantially constant.

The apparatus described so far is well known and operates in such a manner that as the current taken by the load L increases, the magnetic shunt path will become more highly saturated so as to cause more flux to link the winding 3 and thereby increase the voltage applied to the rectifier R as a means of compensating for the voltage drop in the rectifier. In the ordinary automatic rectifier, the increase in applied voltage due to an increase in load is just sufficient to maintain the rectifier output voltage substantially constant, whereupon no discharge takes place from the battery and all of the load current is supplied by the rectifier, except in the event of a power failure. For installations where the apparatus is subjected to a fairly constant heavy load, the above arrangement is satisfactory and the rectifier must, of course, be of sufficient capacity to handle the heavy load. In many installations, however, it so happens that the load which the rectifier must normally supply is not very high, but at infrequent intervals a relatively much heavier load of short duration must be handled by the apparatus. In order that the heavier load may be safely handled by the rectifier, a much larger, higher capacity rectifier would ordinarily be required. However, since a battery is an essential part of the apparatus, there is no reason why the battery should not be utilized to carry the intermittent overload without any substantial sacrifice of the usual advantages accruing from automatic rectifier operation. Accordingly, apparatus embodying my invention makes use of the stand-by battery to supply a substantial portion of the load current during intermittent overloads.

The manner in which I cause the battery to do this is by employing a suitably designed copper-oxide rectifier shunt S across the saturation winding 4—4 as a means of preventing full compensation for the decrease in output voltage with load current, by diverting the excess load current from winding 4—4 during the intermittent overload. The rectifier shunt is suitably poled to aid the flow of load current so that the forward rectifier resistance is employed for the regulating function. This forward resistance, as is well known, decreases with an increase of current, whereby the regulating function becomes more powerful, the heavier the overload. That is to say, when the load current increases, the voltage drop in windings 4—4 will also increase, causing more current to flow in the rectifier shunt which results in a further lowering of the shunt resistance so that a substantial portion of the load current is by-passed around the winding 4—4. Accordingly, the input voltage to the rectifier R will not be raised to its usual value, as required in the usual constant voltage operation, with the result that the battery B will feed some current into the load and will thus relieve the rectifier of the overload. It will be clear, therefore, that the apparatus may be so designed as to reduce the capacity of the rectifier and transformer to that determined by the normal rather than the maximum load current requirements.

Due to the decreased resistance in the load current path resulting from the presence of the rectifier shunt across winding 4—4, particularly in view of the disproportionate decrease in resistance of this shunt with increased load current, the loss of voltage in this portion of the circuit is less than in the usual automatic rectifier so that improved voltage regulation is secured. Also, since the copper-oxide rectifier shunt has inherently a negative resistance-temperature characteristic, its by-pass function is more effective at higher ambient temperatures when protection for the rectifier R is more necessary. Obviously, however, it is not essential that the shunt S be of the copper-oxide type or of the rectifier variety because any suitable shunt having a negative resistance-voltage characteristic and preferably also a negative resistance-temperature characteristic may be advantageously employed. I have found, however, that from the standpoint of reliability and highly effective operation, the copper-oxide rectifier is particularly well suited for this purpose.

Referring now to Fig. 2, the apparatus of this figure is quite similar to that shown in Fig. 1 with the exception that the regulating device in Fig. 2 is a saturable reactor connected in the rectifier input circuit, rather than a regulating transformer, as in Fig. 1. The two impedance windings 6—6 in parallel with one another are connected in series with the rectifier R and serve to adjust the input voltage to the rectifier in accordance with changes in impedance of these windings. Saturating winding 4—4 carries the load current, as in Fig. 1, and alters the saturation of the core of reactor X to produce the change in impedance of winding 6—6. Winding 5—5 functions to limit the change in battery current as a result of a change in the alternating current supply voltage, as in Fig. 1, and may be dispensed with if preferred. The copper-oxide rectifier shunt S is connected across the saturating winding 4—4 as in Fig. 1 and its function in relieving the rectifier R of excess load during intermittent overloads, as well as its voltage regulating and temperature compensating functions will be adequately clear from the description of Fig. 1.

The curve diagram of Fig. 3 shows very clearly the manner in which the battery takes over a substantial portion of the load current during an overload. Curves $a$ and $b$ represent actual test results on one embodiment of the apparatus of Fig. 2, these curves being chosen to illustrate the general features of operation rather than to show quantitatively the full possibilities of the apparatus. Looking at curve $a$ in which the copper-oxide rectifier shunt is absent, it will be noted that throughout the range from no load to the maximum overload, the battery does not contribute any portion of the load current. In curve $b$, however, wherein the copper-oxide shunt is used, as soon as the load current exceeds a value of about one-half ampere the battery contributes an increasingly greater portion of the load current, contributing approximately one-third of this current at the maximum overload in the particular apparatus to which these curves apply. It is obvious that the apparatus will function with either a primary battery or a storage battery. In the case of a storage battery, the apparatus is so adjusted that normally a small charging current flows into the battery. The primary battery would, on the other hand, have either zero current or a small discharge therefrom to maintain the battery in an active condition. Should the supply voltage increase, some charging current will flow into the primary battery but this condition is ordinarily of short duration.

From the foregoing, it will be apparent that I have provided an automatic rectifier combination with stand-by battery, so designed and arranged as to reduce substantially the size and capacity of the usual rectifier used in such apparatus and have, in addition, provided improved voltage regulation and temperature compensation features in this apparatus.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. Voltage regulating apparatus comprising, in combination with a source of alternating current, a saturable reactance device, a rectifier receiving energy from said source through said reactance device, a saturation winding on said device, a load receiving current from said rectifier through said saturation winding, an increase in the load current through said saturation winding causing an increase in the energy received by said rectifier from said source, a battery connected with the output circuit of said rectifier, a control winding on said reactance device connected in series with said battery and wound in a direction to aid said saturation winding when the battery is supplying current, and a shunt around said saturation winding having a negative resistance-voltage characteristic, the parts being so proportioned that when the current taken by the load exceeds a predetermined value said shunt will decrease the effectiveness of said saturation winding so as to cause said battery to share in supplying current to said load.

2. An automatic rectifier comprising, in combination with a source of alternating current, a saturable reactance device, a rectifier receiving energy from said source through said reactance device, a saturation winding on said device, a load receiving current from said rectifier through said saturation winding, an increase in the load current through said saturation winding causing an increase in the energy received by said rectifier from said source, a battery connected with the output circuit of said rectifier, and a shunt around said saturation winding having a negative resistance-voltage characteristic, the parts being so proportioned that when the current taken by the load exceeds a predetermined value said shunt will decrease the effectiveness of said saturation winding so as to cause said battery to share in supplying current to said load.

3. Voltage regulating apparatus comprising, in combination, a reactive transformer having a primary winding energized from a source of alternating current and having a secondary winding supplying current to a load through a rectifier, said transformer having a flux leakage path which carries a saturation winding traversed by the current supplied to said load, an increase in the load current causing an increase in the saturation of said leakage path to thereby increase the output of said secondary winding, a battery connected with the output circuit of said rectifier, and a shunt around said saturation winding having a negative resistance-voltage characteristic, the parts being so proportioned that when the current taken by the load exceeds a predetermined value said shunt will decrease the effectiveness of said saturation winding so as to cause said battery to share in supplying current to said load.

4. Voltage regulating apparatus comprising, in combination, a saturable reactor, an impedance winding on said reactor, a rectifier energized from a source of alternating current through said impedance winding, a load supplied with current from said rectifier, a saturation winding on said reactor traversed by the load current, an increase in the load current causing an increase in the saturation of said reactor to thereby increase the input to said rectifier, a battery connected with the output circuit of said rectifier, and a shunt around said saturation winding having a negative resistance-voltage characteristic, the parts being so proportioned that when the current taken by the load exceeds a predetermined value said shunt will decrease the effectiveness of said saturation winding so as to cause said battery to share in supplying current to said load.

5. An automatic rectifier comprising, in combination with a source of alternating current, a saturable reactance device, a rectifier receiving energy from said source through said reactance device, a saturation winding on said device, a load receiving current from said rectifier through said saturation winding, an increase in the load current through said saturation winding causing an increase in the energy received by said rectifier from said source, a battery connected with the output circuit of said rectifier, and a copper-oxide rectifier shunt around said saturation winding poled in the aiding direction with respect to the flow of said load current, the parts being so proportioned that when the current taken by the load exceeds a predetermined value said shunt will decrease the effectiveness of said saturation winding so as to cause said battery to share in supplying current to said load.

6. Voltage regulating apparatus comprising, in combination, a reactive transformer having a primary winding energized from a source of alternating current and having a secondary winding supplying current to a load through a rectifier, said transformer having a flux leakage path which carries a saturation winding traversed by the current supplied to said load, an increase in the load current causing an increase in the saturation of said leakage path to thereby increase the output of said secondary winding a battery connected with the output circuit of said rectifier, and a copper-oxide rectifier shunt around said saturation winding poled in the aiding direction with respect to the flow of said load current, the parts being so proportioned that when the current taken by the load exceeds a predetermined value said shunt will decrease the effectiveness of said saturation winding so as to cause said battery to share in supplying current to said load.

7. Voltage regulating apparatus comprising, in combination, a saturable reactor, an impedance winding on said reactor, a rectifier energized from a source of alternating current through said impedance winding, a load supplied with current from said rectifier, a saturation winding on said reactor traversed by the load current, an increase in the load current causing an increase in the saturation of said reactor to thereby increase the input to said rectifier, a battery connected with the output circuit of said rectifier, and a copper-oxide rectifier shunt around said saturation winding poled in the aiding direction with respect to the flow of said load current, the parts being so proportioned that when the current taken by the load exceeds a predetermined value said shunt will decrease the effectiveness of said saturation winding so as to cause said battery to share in supplying current to said load.

8. An automatic rectifier comprising, in combination with a source of alternating current, a saturable reactance device, a copper-oxide rectifier receiving energy from said source through said reactance device, a saturation winding on said device, a load receiving current from said rectifier through said saturation winding, an increase in the load current through said saturation winding causing an increase in the energy received by said rectifier from said source, a battery connected with the output circuit of said rectifier, and a shunt around said saturation winding having a negative resistance-voltage and a negative resistance-temperature characteristic, the parts being so proportioned that when the current taken by the load exceeds a predetermined value said shunt will decrease the effectiveness of said saturation winding so as to cause said battery to share in supplying current to said load, said shunt becoming more effective with increased temperature to thereby cause said battery to supply more current and so to decrease the load on said copper-oxide rectifier when the ambient temperature increases.

LINNIE K. HEDDING.